United States Patent

De Missimy et al

[11] 3,805,061
[45] Apr. 16, 1974

[54] OBJECT DETECTING APPARATUS

[75] Inventors: Phillipe R. Des Rioux De Missimy, Cambridge; Herman W. Erichsen, Medfield; Raymond C. Webb, Foxboro, all of Mass.

[73] Assignee: Tyco Laboratories, Inc., Waltham, Mass.

[22] Filed: Apr. 23, 1973

[21] Appl. No.: 353,241

[52] U.S. Cl. ................. 250/209, 250/221, 317/127, 340/258 B, 250/350
[51] Int. Cl. ...................... G08b 13/00, H01h 47/24
[58] Field of Search .......... 250/209, 220, 221, 350; 340/258 B; 317/124, 127

[56] References Cited
UNITED STATES PATENTS

| | | | |
|---|---|---|---|
| 2,900,521 | 8/1959 | Eames | 250/221 X |
| 3,025,406 | 3/1962 | Stewart et al. | 250/221 X |
| 3,704,396 | 11/1972 | MacDonald | 250/221 X |
| 3,742,222 | 6/1973 | Endl | 250/209 |
| 3,746,863 | 7/1973 | Pronovost | 250/221 X |

*Primary Examiner*—James W. Lawrence
*Assistant Examiner*—T. N. Grigsby
*Attorney, Agent, or Firm*—Schiller & Pandiscio

[57] ABSTRACT

The invention is a system for detecting intrusion of a predetermined area by an object and for operating or terminating operation of an associated apparatus when such intrusion occurs. By way of example, the system may be used to actuate an alarm and/or stop a machine such as a metal stamping press. It consists of a transmitter unit having a plurality of radiant energy sources that are strobed and a receiver unit comprising a plurality of radiant energy detector channels that are activated sequentially in synchronism with strobing of the radiant energy sources, the synchronous operation of the receiver unit being achieved without direct mechanical or electrical connection of the transmitter and receiver unit.

15 Claims, 9 Drawing Figures

OBJECT DETECTING APPARATUS

This invention relates to apparatus for sensing the presence of objects in a predetermined area and more particularly to photosensitive detection apparatus.

Photoelectric object detecting systems are known which employ a beam of radiant energy and a radiant energy detector to determine the presence (or absence) of an object at a specified location traversed by the beam. Such systems are commonly employed to actuate intrusion alarms, operate actuators for opening or closing doors or gates, or "initiate" fail-safe stoppage of machines such as metal stamping presses. Detecting an object that moves along a clearly defined path which is intersected by a narrow beam of radiant energy is relatively simple. However, detecting the presence of an object in an area of substantial two-dimensional extent, e.g. a rectangular area in a vertical plane, is another matter, particularly in the case where the objects to be detected may vary in size and shape and can enter or pass through the secified area randomly. Heretofore a number of different methods have been employed to render an area of substantial two-dimensional extent sensitive to intrusion by an object. One method utilizes a plurality of aligned continuously operating light sources for providing discrete light beams that are projected from one side of the two-dimensional area, and a like plurality of correspondingly aligned light detectors at the opposite side of the same area that respond to interruptions of the light beams. A variation of this method is to employ a single light source and a single light detector and means for causing the single light beam to be reflected back and forth from one side to the other of the two-dimensional area before it reaches the detector. These methods require expensive and/or complicated collimating and other refracting means to prevent interference from stray light and, in the case of a plurality of detectors each aligned with a different pencil beam light source, to prevent "cross-talk." For obvious reasons, such methods are expensive to implement. Another approach has been to blanket the area to be monitored with a light curtain provided by a relatively long light projecting device and to sense interruption of the curtain with a light detector in the form of an elongate strip of photosensitive material whose electrical resistance decreases with increasing illumination. The presence of an object is determined by sensing changes in the electrical resistance of the detector. This method, described in U.S. Pat. No. 3235738, is not satisfactory since it lacks the sensitivity and accuracy provided by other above-described techniques.

It has also been contemplated to employ a plurality of light sources and light detectors, with each light source aligned with a different detector, and control means including cable means connecting the light sources and detectors for strobing the light sources and detectors in synchronism, whereby only one light source and the single detector aligned therewith are activated at any one time. This arrangement eliminates cross-talk problems and thus reduces the cost of expensive refracting devices to provide narrow collimated beams. However, it is not suited for many machine control applications because of the need for direct electrical connections between the light sources and the detectors.

Accordingly, the primary object of the present invention is to provide a method and apparatus for detecting the presence or absence of an object from a predetermined area of substantial two-dimensional extent which improve upon the prior art.

Another object is to provide a photosensitive detection system which is adapted for a variety of uses, e.g. as an intrusion detector or a safety control for a machine.

Still another object is to provide a detection system of the character described which employs a plurality of beams of light yet avoids the need for expensive collimators and other light refracting or reflecting means.

A further object is to provide an improved detector apparatus that utilizes a plurality of beams of a suitable form of radiant energy to blanket a two-dimensional field and a plurality of detectors responsive to such energy for detecting when the field is intruded by an object.

A more specific object is to provide a novel photosensitive detection system which comprises a transmitter unit having a plurality of light sources that are strobed, and a receiver unit comprising a plurality of photodetector channels that are activated sequentially in synchronism with strobing of the light sources, the synchronous operation of the receiver unit being achieved without direct mechanical or electrical connection of the transmitter and receiver units.

The foregoing objects and other objects hereinafter disclosed or rendered obvious are achieved by providing a transmitter unit and a receiver unit that are physically separated yet coact to monitor a specified two-dimensional area for random intrusion by an object. The transmitter comprises a plurality of radiant energy sources each adapted to produce a beam of radiant energy when activated, and means for strobing the energy sources at a predetermined frequency and in a predetermined order. The receiver unit comprises a like plurality of radiant energy detector means disposed to receive the beams produced by the transmitter unit, plus detector signal channels which are activated by strobing signals occurring at the same frequency and in the same order as the energy sources are strobed. The strobing signals for the detector signal channels are generated internally of the receiver unit in response to operation of the transmitter unit. Provision is made for rendering the strobing operation of the transmitter unit insensitive to transient signals. In the preferred embodiment, the radiant energy is infrared light and the receiver is provided with a dual relay arrangement to assure "fail-safe" operation.

Other features and many of the attendant advantages of the invention are described in or rendered obvious by the following description of a preferred embodiment of the invention which is to be considered together with the accompanying drawings wherein.

In the drawings, like characters of reference denote like parts.

Figure 1:
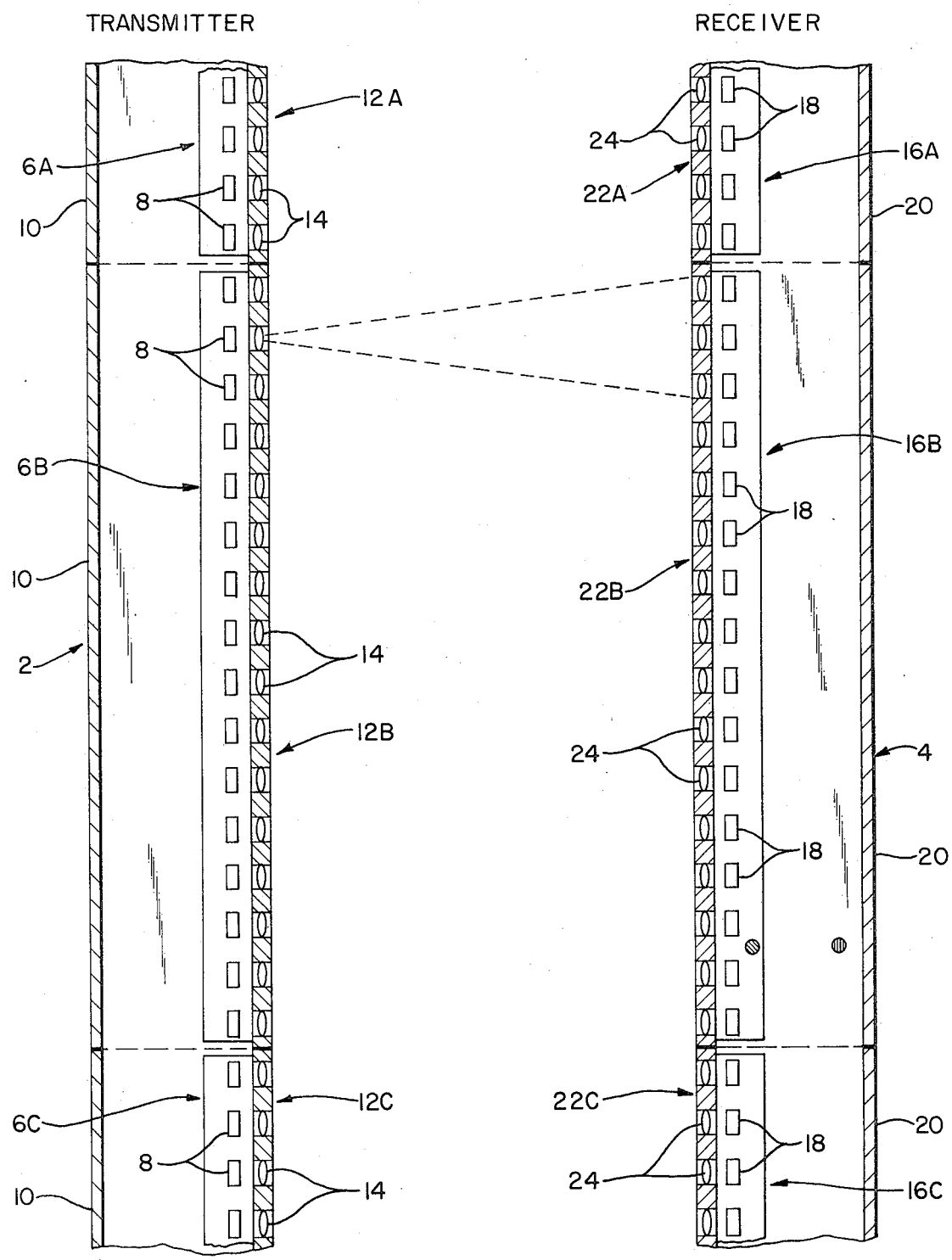
FIG. 1 is a fragmentary sectional view in side elevation showing certain components of the transmitter and receiver units.

Referring now to FIG. 1, the numeral 2 designates an elongate transmitter housing mounting a plurality of uniformly spaced light sources and the numeral 4 designates an elongate receiver housing mounting a corresponding number of uniformly spaced light detectors. In the usual case, the transmitter and receiver are mounted in spaced relation to each other so as to define and monitor a field or area having a horizontal dimension and a vertical dimension, and the height of these units together with the number of light sources and photodetectors embodied therein will vary according to the vertical dimension of the field to be monitored. From a functional standpoint and depending upon the same vertical dimension, the light sources in the transmitter unit are coupled in one or more groups with the members of each group being strobed in a predetermined order and at the same time as corresponding members of other groups. The photodetectors of the receiver unit also are arranged in one or more corresponding functional groups and are coupled to signal channels that are controlled by strobing signals occurring at the same frequency as the frequency at which the members of each light source group are strobed. From a mechanical standpoint, the transmitter and receiver units are modular in concept. Thus, each transmitter housing may contain one or more light source assemblies each comprising one or more light sources, and one or more collimating lens assemblies providing a collimating lens for each light source. Similarly the receiver housing may contain one or more photodetector assemblies each comprising one or more photodetectors, and one or more collecting lens assemblies providing a collecting lens for each photodetector.

Still referring to FIG. 1, the transmitter housing 2 contains three like assemblies 6A, 6B and 6C each comprising a plurality of uniformly spaced light sources 8. Although the assemblies 6A and 6C are not fully shown, it is to be understood that they consist of the same number of light sources as assembly 6B. The light sources 8 are illustrated schematically since they may take various forms such as incandescent or gas lamps or light-emitting diodes (LEDs), depending upon the type of radiation desired. Thus, for infrared or near infrared radiation, the light sources may be incandescent tungsten filament lamps, cesium vapor lamps or LEDs of a type known to persons skilled in the art. In the preferred embodiment hereinafter described, the light sources are LEDs that generate primarily infrared or near infrared radiation. The rear side of transmitter housing 2 is closed off by removable rear panels 10. On the front side of the housing there are three like lens holder panels 12A, 12B and 12C each having a plurality of uniformly spaced apertures within which are mounted identical collimating lenes 14. Each lens 14 is aligned with a different light source 8. Similarly, the receiver housing 4 contains three like assemblies 16A, 16B and 16C each comprising a plurality of photodetectors 18. Although not shown fully, it is to be understood that assemblies 16A and 16C consist of the same number of photodetectors as assembly 16B. The photodetectors are illustrated schematically since they may also take various forms known to persons skilled in the art, e.g. photoconductive, photosensitive or photovoltaic cells, notably photodiodes or phototransistors. Preferably as in the illustrated embodiment, the detectors are phototransistors with a peak sensitivity in the infrared or near infrared range according to the primary radiation emitted by the light sources. The rear side of receiver housing 4 is closed off by removable rear panels 20. On the front side of the receiver housing there are three like lens holder panels 22A, 22B and 22C each having a plurality of uniformly spaced apertures within which are mounted identical collecting lenses 24. Each lens 24 is aligned with the photosensitive surface of a different photodetector 18.

In the typical installation, the transmitter and receiver units are mounted so that light sources 8, lenses 14 and 24, and detectors 18 are located in a common vertical plane with each light source and associated lens being at substantially the same level as the corresponding detector and its associated collecting lens and the optical axis of each lens being substantially horizontal. The transmitter and receiver are spaced apart a suitable distance, e.g. 8 feet, with the axes of the lenses 14 being in substantial alignment with the axes of lenses 24. A feature and advantage of this invention is that it is not necessary for the light produced by light sources 8 to be collimated into a beam that is so narrow as to be capable of illuminating only one detector. Accordingly, a relatively inexpensive collimating lens may be used to direct the light emitted by the light sources to the collecting lenses 24 (relatively inexpensive collecting lenses also may be used since all that is required is that they direct received illumination onto the photosensitive surfaces of the photodectors). The degree of collimation that is required depends upon the spacing between the receiver and transmitter, the physical spacing of detectors in each functional group, and the order in which the light sources and signal channels in each functional group are strobed. Preferably as in the present embodiment, the collimating lenses are designed so that for a given spacing between the transmitter and receiver housings, e.g. 8 feet, the beam from each light source will be collimated so as to illuminate no more than several, e.g. three photodetectors.

For convenience of explanation, in the illustrated embodiment of the invention, the light sources in the assembly 6B constitute one functional group and the light sources in the assemblies 6A and 6C constitute two other functional groups. Similarly, the detectors in assembly 16B constitute one functional group and the detectors in assemblies 16A and 16C constitute two other functional groups. Each of the three groups or assemblies of light sources 8 consists of 16 LEDs with a uniform spacing therebetween of about three-fourths inch, and each of the three groups of photodedectors consists of 16 phototransistors that also are spaced apart at intervals of three-fourths inch. The same spacing of light sources and detectors is maintained between groups of light sources and detectors respectively.

Figure 2:
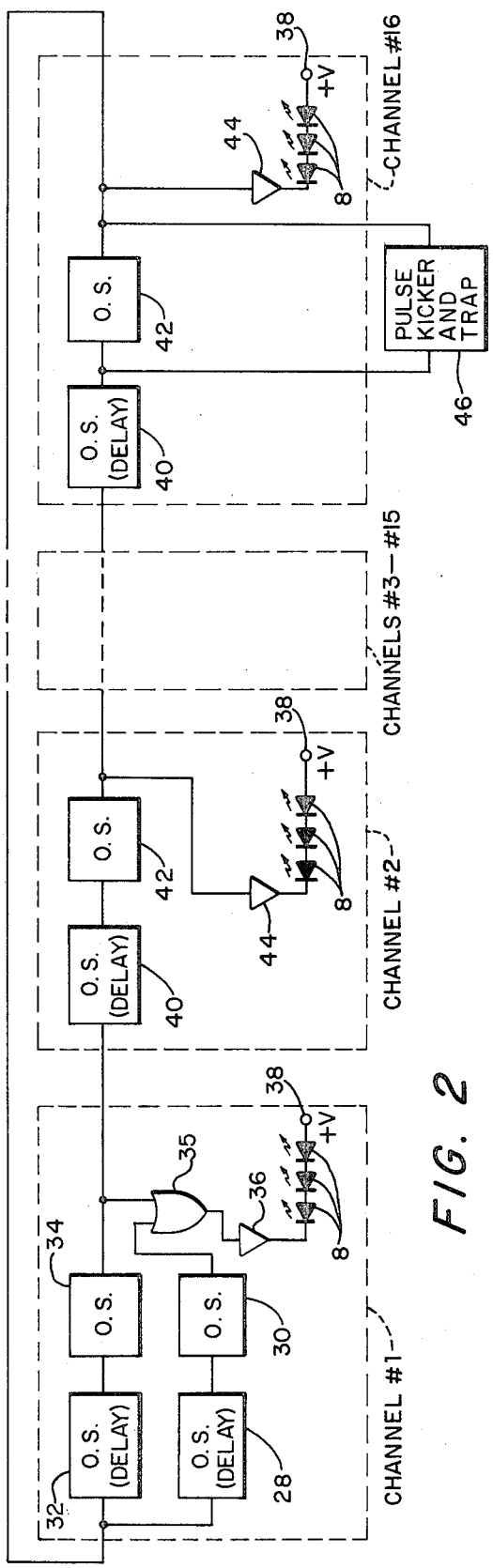
FIG. 2 is a schematic diagram of the electrical system of the transmitter unit.

Referring now to FIG. 2, the light sources 8 of each of the three groups 6A, 6B and 6C are energized one at a time. Because of the relatively close spacing of the light sources (and also of the photodetectors) and the fact that each beam will illuminate more than one photodetector, the light sources 8 are strobed in a predetermined sequence different from the order in which they are physically arranged in their respective assemblies 6A, 6B and 6C. Accordingly, and to provide correlation with the receiver unit, the first light source of each group energized in the aforesaid predetermined sequence and the circuitry provided for simultaneously energizing the same are collectively identified as "Channel No. 1." Similarly, the second light source to be energized in each group and the circuitry for simultaneously strobing the same are collectively identified as "Channel No. 2." The last light source of each group to be energized, together with the associated energizing circuitry, are identified as "Channel No. 16." In FIG. 2 transmitter channels No. 3–15 are omitted for convenience of illustration and description.

As seen in FIG. 2, channel No. 1 of the transmitting unit comprises a first monostable multivibrator or "one-shot" (OS) 28 which is adapted to provide an output pulse of 300 microseconds. The output signal of one-shot 28 is applied as an input signal to trigger a second one-shot 30 which is adapted to provide an output pulse of 20 micro-seconds in response to the negative trailing edge of the input from one-shot 28.. Channel No. 1 also includes a one-shot 32 which is adapted to provide an output pulse of approximately 430 microseconds. The output line of one-shot 32 is employed to trigger a one-shot 34 which is a duplicate of one-shot 30 and hence also produces an output pulse of 20 microseconds in response to the negative going trailing edge of the input of one-shot 32. The output lines of one-shots 30 and 34 are connected to the input lines of an OR gate 35 which drives a current amplifier 36. Connected in series between the output line of amplifier 36 and a positive voltage source terminal 38 are the channel No. 1 LED's of assemblies 6A, 6B and 6C.

Channel 2 of the transmitting unit consists of a one-shot 40 whose input line is connected to the output line of one-shot 34. Responsively to the negative trailing edge of the output of one-shot 34, one-shot 40 will operate to provide 275 microsecond output pulse. The output line of one-shot 40 is coupled to the input of a one-shot 42 which is a duplicate of one-shots 30 and 34, i.e. it is adapted to produce an output pulse of 20 microseconds in response to the negative-going trailing edge of its input from one-shot 40. The output line of one-shot 42 is connected to the input line of a current amplifier 44. Connected in series between the output line of amplifier 44 and a positive voltage source terminal 38 are the Channel No. 2 LEDs of assemblies 6A–C.

Channels No. 3–No. 15 (not shown) are duplicates of Channel No. 2 and are connected in series between Channels No. 2 and Channel No. 16. Accordingly the output signal from one-shot 42 of Channel No. 2 is employed to trigger a one-shot in channel No. 3 corresponding to one-shot 40, and the output of that one-shot is employed to trigger a one-shot corresponding to one-shot 42. The output of the latter one-shot is employed to trigger the one-shot 40 of Channel No. 4 and also to drive a third current amplifier 44 which operates the Channel No. 3 light emitting diodes of assemblies 6A, 6B and 6C. The one-shots 40 and 42 of Channels No. 4–No. 15 are similarly operated in sequence to sequentially energize the corresponding LEDs of assemblies 6A, 6B and 6C.

The one-shot 40 of Channel No. 16 has its input line connected to the output line of one-shot 42 of Channel No. 15, while the output line of one-shot 42 of Channel No. 16 is connected to the input line of one-shots 28 and 36 of Channel No. 1. As a consequence one-shots 28 and 36 are triggered by the trailing edge of each output pulse of one-shot 42 of Channel NO. 16. Thus the one-shots 32 and 34 of Channel No. 1 and the one-shots 40 and 42 of the other 15 channels function similarly to a ring counter. Channel No. 16 also includes a pulse kicker and a trap circuit 46 which initiates operation of the one-shots and also serves to prevent the one-shots from being triggered by undesired transient signals.

Figure 4:
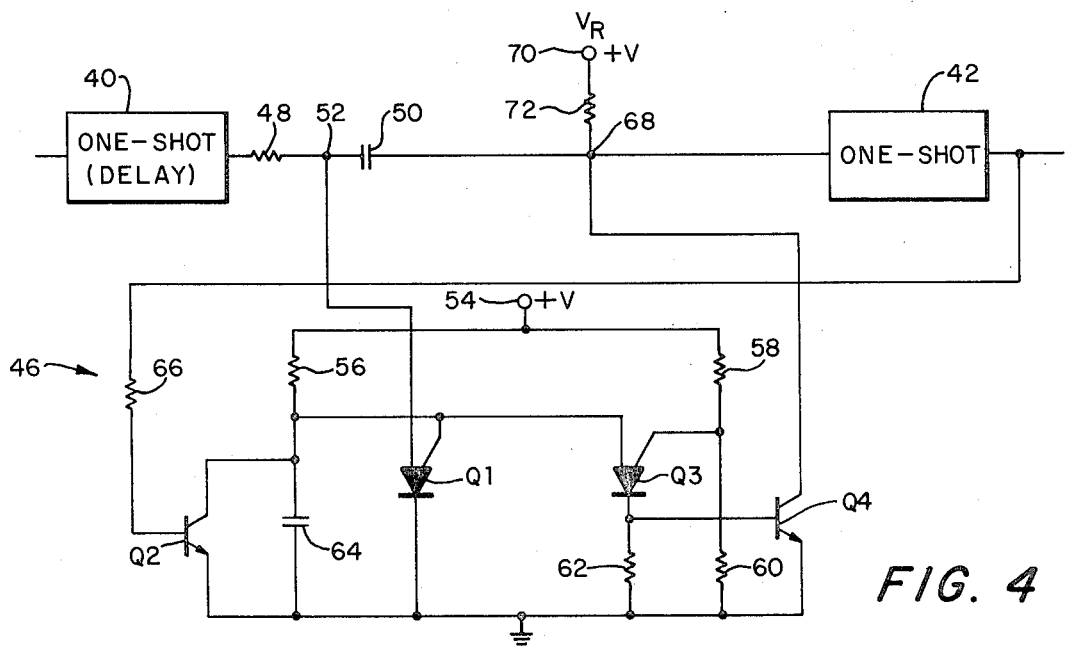
FIG. 4 is a wiring diagram of the pulse kicker and pulse trap circuit of the transmitter unit.

The pulse kicker and trap circuit 46 is illustrated in FIG. 4.

Figure 3:
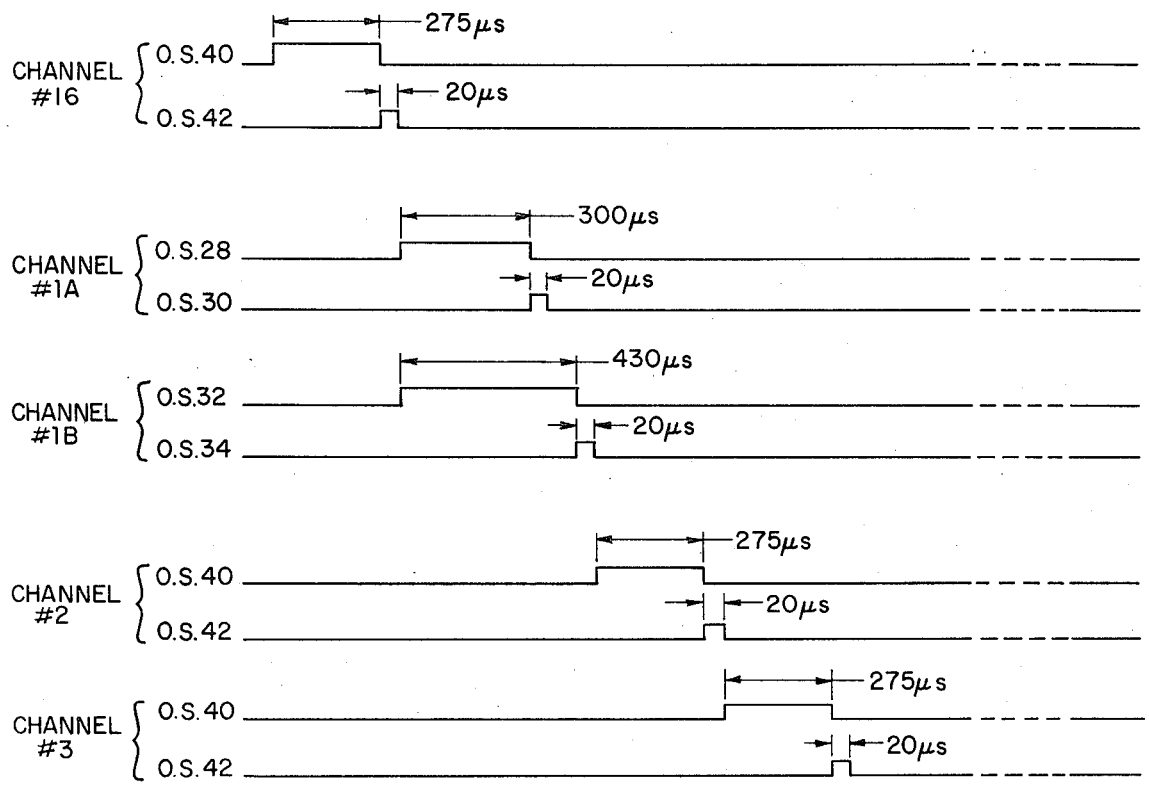
FIG. 3 is a timing diagram pertaining to operation of the transmitter unit.

FIG. 3 illustrates the relationship of the signals produced by the one shots of transmitter Channels 1–16. For convenience of illustration and simplicity, the outputs of the one-shots 40 and 42 of Channels 4–15 are omitted since these output signals are the same as the corresponding signals of channel 2 and have the same time relationship as the corresponding signals of Channels Nos. 2 and 3 in FIG. 3. Also one-shots 28 and 30 are considered to be Channel No. 1A and one-shots 32 and 34 are considered to be Channel No. 1B.

The mode of operation of the system of FIG. 2 is as follows: When the system is turned on, the pulse kicker and trap circuit 46 initiates operation of the one-shot 42 of Channel No. 16. As a consequence, the Channel No. 16 LEDs of the three assemblies 6A, 6B and 6C are energized. At the same time the output signal pulse of one-shot 42 of Channel No. 16 is applied to the input line one-shots 28 and 32. After the appropriate delays afforded by the output pulses of these two one-shots, the one-shots 30 and 34 are operated. As illustrated in FIG. 3, the output pulse of one-shot 30 occurs before the output of one shot 34. Accordingly, the three Channel No. 1 LEDs are simultaneously energized briefly twice for about 20 microseconds in response to the output of one-shot 42 of Channel No. 16. The output of one-shot 34 of Channel No. 1 triggers one-shot 40 of Channel No. 2. After a delay of approximately 275 microseconds, one-shot 42 of Channel No. 2 is triggered. As a result the Channel No. 2 LEDs of the three assemblies 6A, 6B and 6C are simultaneously energized briefly for about 20 microseconds. The output of one-shot 42 of Channel No. 2 causes operation of the one-shots of Channel No. 3, whereupon the three LEDs of the channel are energized briefly for about 20 microseconds. The light-emitting diodes of Channels 4–16 are energized sequentially in the same manner, with operation of the three LEDs of Channel No. 16 being accompanied by re-triggering of one-shots 28 and 32 of Channel No. 1.

Referring now to FIG. 4, the output line of the one shot 40 of Channel No. 16 is connected by a series resistor 48 and a coupling capacitor 50 to the input line of one-shot 42 of the same channel. The junction 52 of resistor 48 and capacitor 50 is connected to the anode of a programmable unijunction transistor Q1 whose cathode is connected to ground. The gate of transistor Q1 is connected to the anode of a programmable unijunction transistor Q3 and also to a positive d.c. voltage source terminal 54 via a resistor 56. The gate of transistor Q3 is connected to the junction of two resistors 58 and 60 which form a voltage divider connected between the positive voltage source terminal 54 and ground. The cathode of transistor Q3 is connected to ground via a resistor 62.

Still referring to FIG. 4, a capacitor 64 is connected across transistor Q1, with one side of the capacitor being connected to the junction of resistor 56 and the gate of transistor Q1, and the other side of the same capacitor being connected to ground. The junction of resistor 56 and the gate of transistor Q1 is also connected to the collector of a transistor Q2. The emitter of the same transistor is connected to ground, while its base is connected by way of a resistor 66 to the output line of one-shot 42 of Channel No. 16. The input line of the same one-shot is connected at point 68 to a positive voltage source 70 via a bias resistor 72, and also to the collector of a transistor Q4. The base of transistor Q4 is connected to the cathode of the unijunction transistor Q3, while its emitter is connected to ground.

As noted earlier, the circuit of FIG. 4 acts (a) as a "pulse kicker" to initiate operation of the transmitter system of FIG. 2 and (b) as a pulse trap to prevent undesired operation of the same system by spurious transient signals. The pulse kicker aspect of the circuit of FIG. 4 will now be described. If no signal pulse is produced by one-shot 40 of Channel No. 16, the capacitor 64 will charge through resistor 56 from the positive voltage source at terminal 54. When capacitor 64 reaches the selected voltage level, the transistor Q3 will fire through resistor 62. As a result of the voltage across resistor 62, the transistor Q4 will conduct and will drop the voltage at point 68 to ground. When point 68 drops to ground potential, one-shot 42 of channel No. 16 will fire and the system will commence strobing the LEDs.

The pulse kicker circuit also includes means for preventing it from firing one-shot 42 of Channel No. 16 during normal operation of the transmitter, thus obviating the possibility of an extra input signal to one-shot 42 of Channel No. 16. In this connection it is to be noted that the voltage at terminal 54 and the values of resistor 56 and capacitor 64 are set so that the time required to charge up capacitor 56 is longer than the time required to serially operate the one-shots of all 16 channels. Accordingly, when the Channel No. 16 one-shot 42 fires in response to the output of the associated flip-flop 40, as occurs during normal operation of the system, the output pulse of one-shot 42 will cause transistor Q2 to conduct, and this will occur before the voltage on capacitor 64 has charged up to the level required to fire transistor Q3. As a consequence, transistor Q4 will remain off and point 68 will be unable to drop low enough to fire one-shot 42 of Channel No. 16. It is believed to be apparent from the foregoing description that the pulse kicker aspect of the circuit 46 is such that the circuit not only starts the transmitter up when the power is turned on but also acts as a safeguard to reinstate operation of the transmitter unit in the event it stops operating because of the pulse output of one of the one-shots being insufficient to trigger the next-in-line one-shot of the same or succeeding channel.

The pulse trap aspect of the circuit of FIG. 4 involves transistor Q1. If a spurious transient pulse occurs at the output of one-shot 40 of Channel No. 16 and such pulse is of sufficient magnitude to cause the anode of transistor Q1 to become equal to or greater than the potential on the gate of the same transistor, then transistor Q1 will fire and short the bad pulse to ground so that it cannot trigger one-shot 42 of Channel No. 16. It is to be noted that whenever a spurious signal appears on the output line of one-shot 40, the capacitor 64 will not have charged up high enough to prevent transistor Q1 from conducting in response to the spurious signal.

Figure 5:
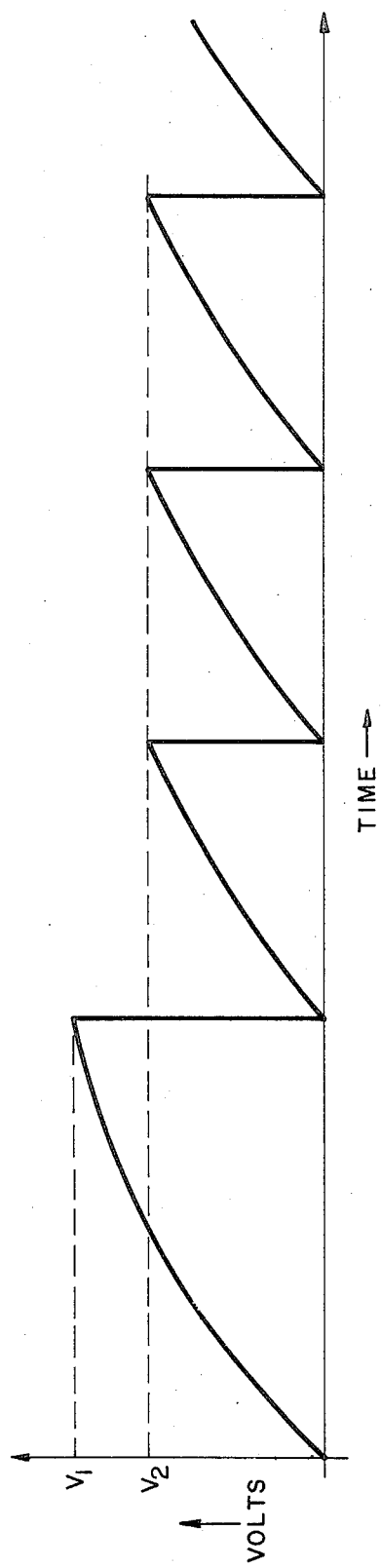
FIG. 5 is a diagram of the voltage wave form at a selected point in the circuit of FIG. 4.

FIG. 5 illustrates the waveform of the voltage across capacitor 64. When the power is initially turned on, the anode of the transistor Q3 (and hence capacitor 64) must rise to a voltage V1 (depending upon the values of resistors 58 and 60) in order for Q3 to fire. Thereafter during normal operation of the system, capacitor 64 will charge up to the value V2 during the time that the one-shots of Channel No. 1–No. 15 and one-shot 40 of Channel No. 16 are firing, and reaches the value V2 just before one-shot 42 of Channel No. 16 fires to switch on transistor Q2 and thereby discharge capacitor 64. Also during normal operation, the output pulse from one-shot 40 of Channel No. 16 will not cause Q1 to fire since its gate voltage will have reached too high a level due to the long charging time afforded capacitor 64.

As previously noted, the light sources in each of the three assemblies 6A, 6B and 6C are strobed in a sequence different from the order in which they are physically disposed. Table I below shows the correlation between light source positions and channel numbers. In this table the channel numbers represent the order in which the light sources of each assembly are illuminated and the light source position numbers indicate the order in which the light sources are physically arranged. The lowermost light source in each assembly occupies position No. 1.

TABLE I

| Channel No. | Light Source Position No. | Channel No. | Light Source Position No. |
| --- | --- | --- | --- |
| 1 | 1 | 9 | 2 |
| 2 | 13 | 10 | 14 |
| 3 | 5 | 11 | 6 |
| 4 | 9 | 12 | 10 |
| 5 | 3 | 13 | 4 |
| 6 | 15 | 14 | 16 |
| 7 | 7 | 15 | 8 |
| 8 | 11 | 16 | 12 |

By strobing the light sources according to Table I, optical and electronic cross-talk between the channels of the receiver is substantially fully eliminated or reduced to a negligible level.

Figure 6:
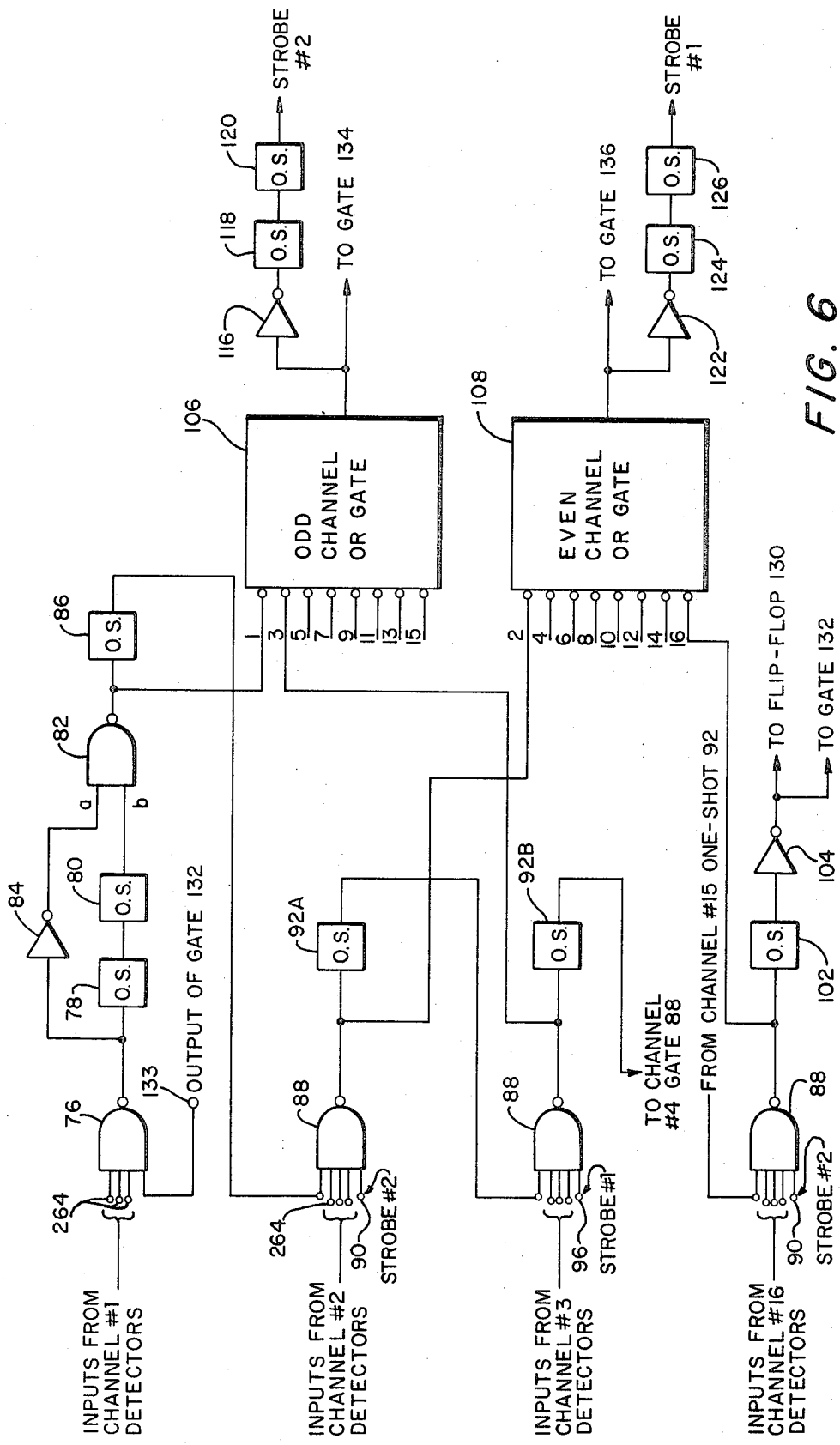
FIG. 6 is a diagram of a portion of the electrical system of the receiver unit.
Figure 7:
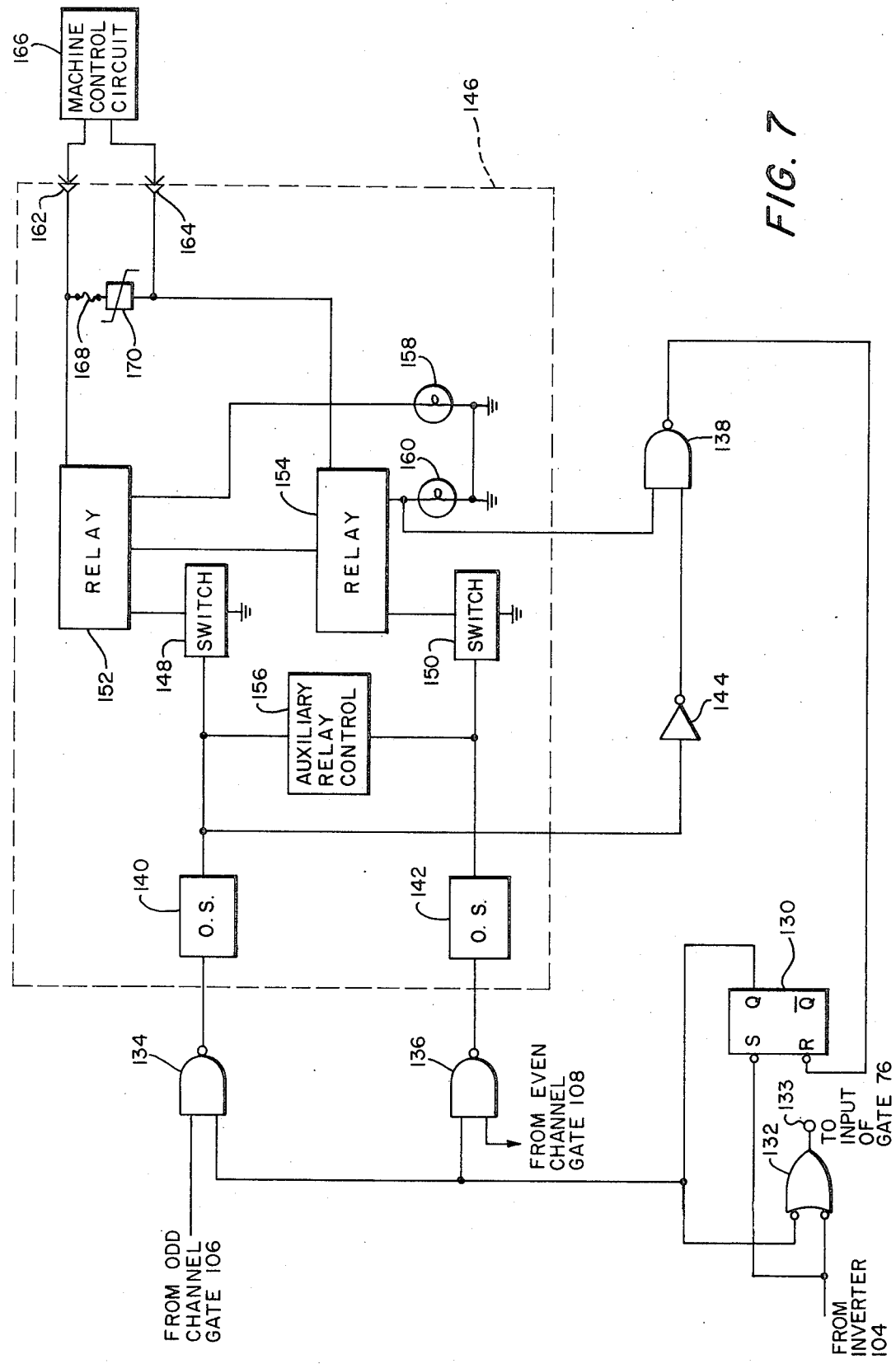
FIG. 7 is a diagram of the remaining portion of the electrical system of the receiver unit.
Figure 8:
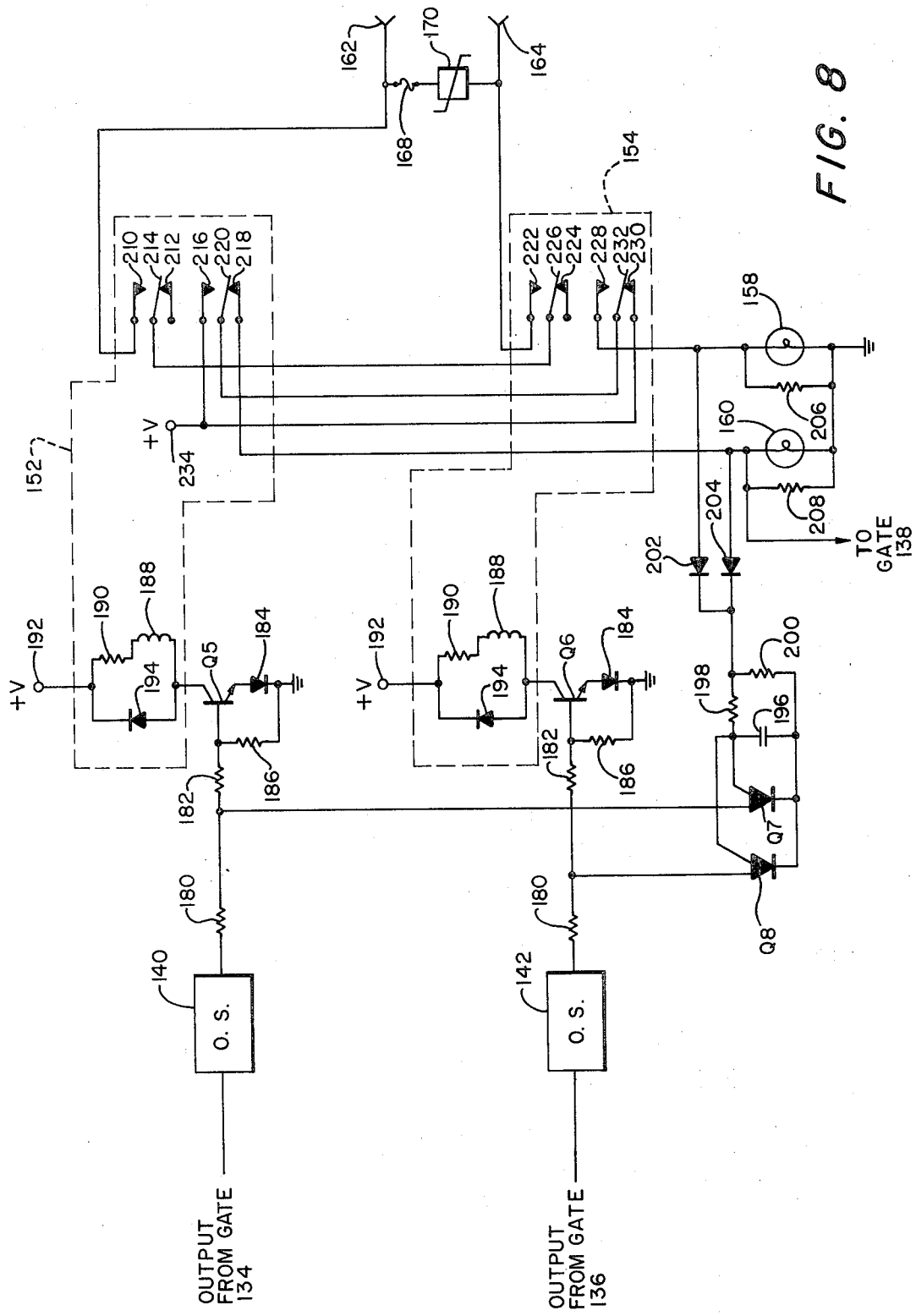
FIG. 8 is a diagram, partly in block form, of a portion of the circuit of FIG. 7.

FIGS. 6, 7, and 8 illustrate the receiver unit. For convenience, only photodetector signal Channels No. 1, 2, 3 and 16 of the receiver are illustrated. The omitted even and odd numbered signal channels are identical to Channels No. 2 and No. 3 respectively.

Referring now to FIG. 6, signal Channel No. 1 of the receiver unit comprises a NAND gate 76 having three input lines connected to receive signal pulses derived from the three Channel No. 1 photodetectors and a fourth input line connected to a terminal 133. The output line of gate 76 is coupled to the input line of a one-shot 78 that is adapted to produce a 93 microsecond output pulse. The output line of one-shot 78 is connected to the input line of a second one-shot 80 which also is adapted to produce a 93 microsecond output pulse. Both of the one-shots 78 and 80, like the other one-shots herein described, are adapted to operate in response to a negative input signal. The output line of one-shot 80 is connected to an input line of another NAND gate 82. The output line of NAND gate 76 is also connected to an inverter 84 whose output line is coupled to the second input line of gate 82. The output line of gate 82 is connected to the input line of a one-shot 86 that is adapted to produce a 429 microsecond output pulse.

Receiver signal Channel No. 2 comprises a NAND gate 88 having three input lines connected to receive signal pulses derived from the three channel No. 2 photodetectors, plus a fourth input line connected to the output line of one-shot 86 and a fifth input line connected to a terminal 90 at which is applied a strobing signal identified as Strobe No. 2. The output line of NAND gate 88 is coupled to the input line of a one-shot 92A which is identical to one-shot 86 and hence is adapted to produce a 429 microsecond output pulse.

Receiver signal Channel No. 3 also comprises a NAND gate 88 which has three of its input lines connected to receive signal pulses derived from the three Channel No. 3 photodetectors. Its fourth input line is connected to the output line of one-shot 92A of Channel No. 2 and its fifth input line is connected to a terminal 96 at which is applied a strobing signal identified as Strobe No. 1. The output line of gate 88 is coupled to the input line of another one-shot 92B which is identical to one-shot 92A.

Photodetector signal Channels No. 4–No. 15 (not shown) are duplicates of signal Channels No. 2 and No. 3 with one input line of the gate 88 of each even numbered channel connected to Strobe No. 2 signal terminal 90 and the corresponding input line of the gate 88 of each odd numbered channel being connected to Strobe No. 1 signal terminal 96. Additionally, the output line of each one-shot 92 is connected to the fifth input terminal of gate 88 of the next channel, e.g. the output lines of one-shots 92 of Channels No. 3 and No. 4 are connected to the fifth input line of the gates 88 of Channels No. 4 and No. 5 respectively.

Photodetector signal Channel No. 16 of the receiver also comprises a NAND gate 88, but the latter's output line is connected to the input line of a one-shot 102 which is adapted to produce a 560 microsecond pulse which is applied as an input to an inverter 104. The output line of inverter 104 is connected to a flip-flop 130 and a gate 132 (FIG. 7).

Still referring to FIG. 6, the illustrated circuit also includes two OR gates 106 and 108 each of which has eight inverting input terminals. One of the input terminals of gate 106 is connected to the output line of gate 82, while its other input terminals are connected to the output lines of the gates 88 of the odd numbered detector signal channels. The input terminals of gate 108 are connected to the output lines of the gates 88 of the even numbered channels. Thus, as illustrated in FIG. 6, the input terminal of OR gate 108 identified by the numeral 16 is connected to the output line of NAND gate 88 of detector signal Channel No. 16.

The output line of odd channel gate 106 is coupled to the input line of an inverter 116 and also to one of the two input lines of NAND gate 134 (FIG. 7). The output line of inverter 116 is coupled to the input line of a one-shot 118 which is adapted to produce a 242 microsecond output pulse. The output line of one-shot 118 is connected to the input line of a one-shot 120 that is adapted to produce a 121 microsecond pulse. The signal pulse appearing on the output line of one-shot 120 is identified as Strobe No. 2. The output line of even channel gate 108 is connected to the input line of an inverter 122 and also to one of the input lines of a NAND gate 136 (FIG. 7). The output line of inverter 122 is coupled to the input line of a one-shot 124 which is identical to one-shot 118. The output line of one-shot 124 is connected to the input line of one-shot 126 which is identical to one-shot 120. The signal pulse appearing on the output line of one-shot 126 is identified as Strobe No. 1.

Referring now to FIG. 7, the flip-flop 130 is an RS flip-flop having its set input terminal line connected to the output of inverter 104 and its reset input line connected to the output of a NAND gate 138. The set and reset terminals of flip-flop 130 are inverting. The Q output line of flip-flop 130 is connected to one of the two inverting terminals of an OR gate 132. The other inverting input terminal of OR gate 132 is connected to the output line of inverter 104. The output line of flip-flop 130 is also connected to one of the two input lines of each of two NAND gates 134 and 136. The output line of NAND gate 134 is connected to a one-shot 140 which is adapted to produce a 902 microsecond output pulse. The output line of NAND gate 136 is connected to the input line of a one-shot 142 which is identical to one-shot 140. The output line of one-shot 140 is connected to an inverter 144 whose output line is connected to one of the two input lines of a NAND gate 138.

The one-shots 140 and 142 form two pulse missing detectors and control relay circuit 146 which is illustrated in block diagram form in FIG. 7 and is illustrated in greater detail in FIG. 8. As seen in FIG. 7, the output lines of one-shots 140 and 142 are connected to switches 148 and 150 which are coupled between ground and two relays 152 and 154 respectively. An auxiliary relay control circuit 156, illustrated in greater detail in FIG. 8, is connected between the one-shots 140 and 142 and the switches 148 and 150. As explained more fully in connection with FIG. 8, a green light bulb 158 is connected between ground and one of the contacts of relay 152 and a red light bulb 160 is connected between ground and one of the contacts of relay 154. The same contact of relay 154 is connected to one of the input lines of NAND gate 138. Certain of the contacts of relays 152 and 154 are connected to two output terminals provided with connectors as shown at 162 and 164 for connecting the receiver unit to the motor or clutch control circuit 166 of a machine to be controlled by the receiver, e.g. an automatic stamping press. Connected across the connectors 162 and 164 is a fuse 168 and a transient suppressor 170.

Referring now to FIG. 8, the output line of one-shot 140 is connected by way of a pair of series resistors 180 and 182 to the base electrode of a transistor Q5 whose emitter is connected to ground through a diode 184. A resistor 186 connects the base of Q5 to ground. The collector of Q5 is connected in series with the solenoid coil 188 of relay 152 and a resistor 190 which is connected to a positive d.c. voltage source terminal 192. A diode 194 is connected across coil 188 and resistor 190.

One-shot 142 is similarly connected to the base electrode of a transistor Q6 and, therefore, like numerals are employed to designate corresponding elements. The junction of resistors 180 and 182 associated with transistor Q5 is connected to the anode of a programmable unijunction transistor Q7, while the corresponding junction of the other pair of resistors 180 and 182 associated with Q6 is connected to the anode of a like programmable unijunction transistor Q8. The cathodes of transistors Q7 and Q8 are connected to ground. The gate electrodes of the same transistors are connected to ground via a capacitor 196. Connected across capacitor 196 are two resistors 198 and 200 which form a voltage divider network. The junction of resistors 198 and 200 are connected to the cathodes of two like diodes 202 and 204. The anodes of diodes 202 and 204 are coupled to ground via resistors 206 and 208 respectively. The green light bulb 158 is connected across resistor 206 while the red light bulb 160 is connected across resistor 208.

Relay 152 comprises two single pole, double throw switches, one of which consists of stationary contacts 210 and 212 and movable contact 214 and the other of which consists of stationary contacts 216 and 218 and movable contact 220. Relay 154 also comprises two single pole, double throw switches, the first of which consists of stationary contacts 222 and 224 and a movable contact 226, and the other of which consists of stationary contacts 228 and 230 and a movable contact 232.

The movable contacts 214 and 220 normally are closed upon contacts 212 and 218 respectively and change positions so as to close upon contacts 210 and 216 respectively when the associated relay coil 188 is energized. Similarly, contacts 226 and 232 are normally closed with respect to contacts 224 and 230 respectively and change positions so as to close with respect to contacts 222 and 228 respectively when the coil of relay 154 is energized.

The movable contacts 214 and 226 of the two relays are coupled to each other, as are the other movable contacts 220 and 232 of the same relays. Contacts 216 and 230 of the two relays are both coupled to a positive d.c. voltage source terminal 234. Contact 212 of relay 152 is not used. Contact 218 of relay 152 is connected to the junction of diode 204 and resistor 208. Contact 228 of relay 154 is connected to the junction of diode 202 and resistor 206. The remaining contacts 210 and 222 of the two relays are connected to the output connector terminals 162 and 164 respectively.

Each photodetector 18 forms part of a discrete module which includes a photodetector signal amplifier. The three photodetector modules for receiver Channel No. 1 are identical to each other and to the photodetector modules associated with the other 15 receiver channels. The circuits of one such photodetector module are illustrated in FIG. 9.

Figure 9:
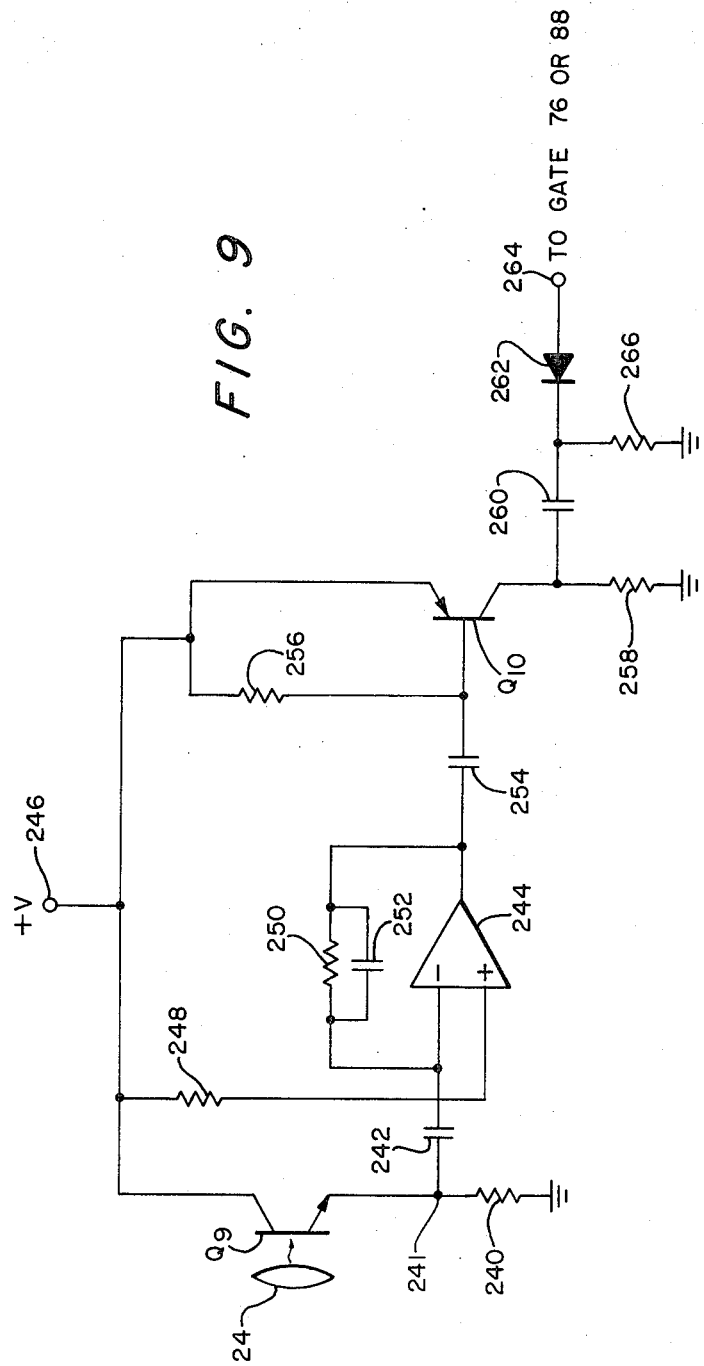
FIG. 9 is a wiring diagram of the front end of one of the detector signal channels of the receiver unit.

Referring now to FIG. 9, each photodetector module comprises a phototransistor Q9 positioned so that its photosensitive surface will be illuminated by the light collected from the associated collecting lens 24. The emitter of phototransistor Q9 is connected to ground via a resistor 240. The emitter is also connected via a capacitor 242 to the negative polarity input terminal of an operational amplifier 244. Resistor 240 and capacitor 242 cooperate to render the amplifier 244 insensitive to steady state d.c. current in the emitter circuit of transistor Q9. The collector of Q9 is coupled to a terminal 246 at which is applied a fixed positive d.c. voltage. Terminal 246 is also connected via bias resistor 248 to the positive polarity input terminal amplifier 244. Connected between the output terminal and the negative polarity input terminal of amplifier 244 is a feedback resistor 250 across which is coupled a capacitor 252.

The signal appearing on the output line of amplifier 244 is applied through a coupling capacitor 254 to the base of a transistor Q10. The emitter of Q10 is connected to voltage terminal 246. The base of the same transistor is connected to terminal 246 through a bias resistor 256. The collector of Q10 is connected to ground through a resistor 258 and is also connected via a capacitor 260 and a diode 262 to a terminal 264. A resistor 266 is connected between ground and the junction of capacitor 260 and diode 262. Each of the three Channel No. 1 photodetector modules has its output terminal 264 connected to a different one of the three detector signal input lines of gate 76. The other 45 photodetector modules are similarly connected to individual detector signal input lines of gates 88 of the other 15 channels.

Each photodetector module operates as follows: When an infrared light beam is focused on its photosensitive surface, phototransistor Q9 will conduct and cause the output line of operational amplifier 244 to go negative. If the light beam is on momentarily as occurs during normal operation of the transmitter unit, amplifier 244 will produce a negative pulse that is inverted and amplified by Q10 and is passed by capacitor 260 and diode 262 to the output terminal 264. If the light beam is on steady, the emitter of Q9, i.e. point 241, will go positive but no pulse will be applied to the negative input terminal of amplifier 244. Hence the output of amplifier 244 will not go negative and no negative output pulse will appear at the base of Q10 to cause it to conduct. Each module also includes a fail-safe feature. In the event transistor Q10 is shorted, capacitor 260 and resistor 266 will cause grounding to prevent an output pulse from appearing at terminal 264.

Operation of the circuit of FIG. 6 will now be described. Assume that the transmitter unit has been turned on and that the sixteen light sources of each of the three groups 6A, 6B and 6C are being strobed as previously described so that the corresponding photodetectors of the three assemblies 16A, 16B and 16C are illuminated by the resulting beams. Assume also that all three Channel No. 1 photodetectors are illuminated briefly and that simultaneously the output line of gate 132 is high. Since all of the inputs of NAND gate 76 are high, its output line will go low and (a) thereby trigger one-shot 78 and (b) cause input line a of gate 82 to go high. However, due to the delay afforded by one-shot 78, one-shot 80 will not have fired to cause the input line b of gate 82 to go high simultaneously with line a. Hence, the output line of gate 82 will be high and hence the No. 1 channel input line of gate 106 will be high and one-shot 86 will remain off so that its output line will remain low. All of the input lines to each of the gates 88 are also low at this time; hence, the output lines of all of the NAND gates 88 will be high. Hence the output line of gate 106 will be low, causing the output line of inverter 116 to be high. As a result, one-shot 118 will not be triggered and the Strobe No. 2 signal terminal will remain low. When the light beams illuminate the Channel No. 1 photodetectors are shut off, terminals 264 of gate 76 go low, its output line goes high and, while this has no effect on one-shot 78, it does cause inverter 84 to render input line a of gate 82 low. Simultaneously, the output line of one-shot 80 is still low due to the delay afforded by one-shot 78. Hence the output line of gate 82 is still high. Since the output lines of gates 88 are also high, the output line of gate 106 will remain low and inverter 116 will be unable to trigger one-shot 118.

Thereafter and before the Channel No. 1 detectors are again illuminated by the second brief reenergization of the Channel No. 1 light sources, one-shot 80 is triggered by the trailing edge of the output pulse from one-shot 78 and hence input line b of gate 82 goes high. However, at this time the other input line of gate 82 is low. Hence its output line is still high. Since the output lines of gates 88 connected to gate 106 are also high, inverter 116 will still be unable to trigger one-shot 118 and hence the Strobe No. 2 signal terminal will remain low. When the Channel No. 1 detectors are again illuminated, inverter 84 will cause input line a of gate 82 to go high. Since at this time the output line of one-shot 80 is still high, the output line of gate 82 will go low. Accordingly, the output line of gate 106 will go high, the output line of inverter 116 will go low, and one-shot 118 will fire. On the trailing edge of the output of one-shot 118, one-shot 120 will fire to cause the Strobe No. 2 terminal to go high to initiate the No. 2 strobe signal. When the light beams illuminating the Channel No. 1 detectors are again shut off, inverter 84 causes line a of gate 82 to go low again. Even if the output line of one-shot 80 is still high, the output line of gate 82 will go high. Since the output lines of gates 88 connected to gate 106 are still high, the output terminal of gate 106 will go low again and the input line of one-shot 118 will go high again. Thereafter, one-shot 80 will revert to its original state and input line b of gate 82 will go low. Since the other input line a of gate 82 is also low, its output line will remain high. The output lines of the odd channel gates 88 being high, the output line of gate 106 will remain low and one-shot 118 will remain off.

It is to be noted that one-shot 86 will fire when the output line of gate 82 goes low, which will occur the second time that the Channel No. 1 LED's illuminate the Channel No. 1 detectors according to the predetermined sequence described in FIG. 3. The one-shot 86 will not fire if the Channel No. 1 detectors are illuminated by the LED's of any other channel due to the timing of the transmitter. With the transmitter operating normally, the output line of one-shot 86 and the Strobe No. 2 terminal will both be high at the time that the Channel No. 2 photodetectors are illuminated. Hence, with all of its input lines being high simultaneously, the output line of NAND gate 88 of Channel No. 2 will go low so that one-shot 92A will fire and the corresponding input line of OR gate 108 will go low. Hence the output line of OR gate 108 will be high and inverter 122 will cause one-shot 124 to fire. The trailing edge of the output pulse of one-shot 124 will cause one-shot 126 to fire, whereupon the Strobe No. 1 terminal will go high and impress a strobe signal at the input terminal of each of the NAND gates 88 associated with the odd numbered channels commencing with Channel No. 3. With the transmitters operating normally, the output line of one-shot 92A and the Strobe No. 1 terminal will be high at the time that the Channel No. 3 photodetectors are illuminated. Hence, with all of its input lines being high simultaneously, the output lines of NAND gate 88 of Channel No. 3 will go low so that one-shot 92b will fire and the output line of OR gate 106 will go high and inverter 116 will cause one-shots 118 and 120 to fire sequentially to produce another Strobe No. 2 signal.

The foregoing operation is repeated sequentially through Channels No. 4–No. 16, with the output line of the one-shot 92 of the preceding odd or even numbered channel and the appropriate strobe signal terminal 90 or 96 being high at the same time as the appropriate photodetectors are illuminated. However, if at the time that a strobe signal is being applied to one of the gates 88 of Channels No. 2–No. 16, it happens that one of the associated photodetectors is not illuminated, as will occur if the light beam aimed at that detector is interrupted by an intruding object, the output line of that particular gate 88 will stay high. Since the output lines of the other gates 88 connected to gate 106 or 108 also will be high at that time, the output lines of gates 106 or 108 will stay low and hence the inverter 116 or 122 associated therewith will not be able to initiate the appropriate No. 1 or No. 2 strobing signal. As a result, regardless of whether or not the photodetectors of the succeeding channels continue to be illuminated in sequence, the gate 88 of the next channel will have its output line stay high and consequently, for reasons already noted, the output line of the associated OR gate 106 or 108 will stay low and prevent generation of strobe signal No. 1 or No. 2 respectively. Also, the one-shot 92 connected to the same gate 88 will not fire. As a consequence, the gates 88 of the remaining channels will be unable to fire the associated one-shots 92 and 102.

Continuing now with normal operation of the receiver, when all of the inputs to gate 88 of Channel No. 16 are high, the output line of that gate will go low and cause one-shot 102 to fire and produce a positive pulse which is inverted by inverter 104 and applied to the set terminal of flip-flop 130 (FIG. 7) and also to one of the inverting input terminals of OR gate 132. The applied signal causes the latter terminal to go high. At the same time, the negative signal applied to the set terminal of flip-flop 130 causes its Q terminal to stay high with the result that the signal input at the other inverting input terminal of gate 132 goes low. Under these conditions, the output line of gate 132 will go high. As a consequence, gate 76 is enabled to fire one-shot 78 upon simultaneous illumination of all three channel No. 1 photodetectors. The output line of gate 132 (and hence terminal 133 of FIG. 6) will go low if the flip-flop is in the set state, i.e. its Q terminal is high, at the same time that the output line of inverter 104 is high (the latter condition exists only if one-shot 102 has not been triggered, which is true whenever one of the Channel No. 16 photodetectors is not illuminated or whenever a No. 2 strobe signal is not applied to the gate 88 of that same channel). Flip-flop 130 is reset when the output line of NAND gate 138 goes low (which occurs when one of the relays 152 and 154 goes off).

If the output line of OR gate 106 goes high at the time that the Q terminal of flip-flop 130 is high, the output line of gate 134 will go low. Similarly, the output line of gate 136 will go low if the inputs from OR gate 108 and the Q terminal of flip-flop 130 are high simultaneously. One-shots 140 and 142 will fire each time the output lines of gates 134 and 136 respectively go low. Hence during normal operation, one-shots 140 and 142 will fire in synchronism with but before triggering of the strobe signal one-shots 120 and 126 respectively. The one-shots 140 and 142 will stay on continuously during normal operation since the time interval between successive negative input pulses from gate 134 and 136 respectively is less than the time duration of the output pulses of the one-shots. If an input pulse is not applied early enough or not at all by gate 134 or 136, the output line of one-shot 140 or 142 respectively will go low and switch 148 or 150 will open and deenergize the solenoid of relay 152 or 154 respectively. Switches 148 and 150 will stay closed so long as the output lines of one-shots 140 and 142 respectively are high.

Referring now to FIG. 8, switches 148 and 150 comprise transistors Q5 and Q6 respectively. So long as the output lines on one-shots 140 and 142 are high, the voltages on the base electrodes of Q5 and Q6 are high enough to cause the transistors to stay on and thereby maintain relay coils 188 energized. If both relay coils are deenergized, the red light 160 will be turned on by current flowing through contacts 218, 220, 232, and 230, while the green light will be off. If both relay coils are energized, green light 158 will be turned on by current flowing through contacts 216, 220, 232 and 228. If only one relay coil is deenergized, both of the lights 158 and 160 will be turned off.

During normal operation with both relay coils energized, the transistors Q7 and Q8 are both off. In the event one relay drops out and the other does not, the UJTs operate to deenergize the relay that is still on. If both relay coils are energized, capacitor 196 will be charged up through contacts 216, 220, 232 and 228 and diode 202 to a level high enough when the output lines of one-shots 140 and 142 are both high to prevent the Q7 and Q8 from conducting. However, if now the output line of one-shot 140 goes low and thus causes the coil of relay 152 to be deenergized, the contacts of that relay coil revert to the state shown in FIG. 8. As a result, capacitor 196 will begin to discharge through resistors 198 and 200, and when it drops to a suitable level, the PUT Q8 will fire. Conduction of Q8 will lower the base voltage of Q6 enough to shut off that transistor and thereby deenergize the coil of relay 154. The PUT Q7 will operate in the same manner to shut off Q5 if relay 152 stays on when relay 154 is turned off, e.g. by lack of a signal from one-shot 142.

The inverter 144, gate 138 and flip-flop 130 are provided to prevent possible relay chatter when an object interrupts the light barrier. If a person interrupts a beam other than a Channel No. 1 beam, receiver Channel No. 1 will restart operation of the receiver again when the Channel No. 1 detectors are again illuminated if the output line of gate 132 is high. As soon as the strobe signals begin to be generated and one-shots 140 and 142 are turned on again, the relay coils will be reenergized and will stay on until a beam is again interrupted. Thus if a person keeps intercepting a beam, the relays will go off and on again repetitively. This relay chatter will not affect operation of the machine being controlled by the receiver since the typical machine control circuit will inmobilize the machine as soon as one of the relays 152 and 154 drops out. However, this repeated operation of the relays is noisy and also cuts down relay life. Accordingly, inverter 144, gate 138 and flip-flop 130 cooperate with gate 132 to prevent triggering of one-shots 140 and 142 after both relays have shut down. If both relays go off so that red light 160 goes on, the voltage developed across resistor 208 will cause one of the input lines of gate 138 to go high. Now if the output line of one-shot 140 is low, inverter 144 will make the other input line of gate 138 go high. As a result, the output line of gate 138 will go low and reset flip-flop 130 so that its Q terminal will go low. As a consequence, gates 134 and 136 will be disabled and one-shots 140 and 142 cannot fire and turn on the relays. However, the output line of gate 132 will be high due to its input from inverter 104 being high and the signal at its other input line being low. Since terminal 133 is high, the No. 1 channel one-shots 78 and 80 will again fire in response to illumination of the No. 1 detectors and the receiver channels will again cycle until the strobing signal is applied to the gate 88 of the channel corresponding to the beam that is broken. If the channel is other than No. 16, inverter 104 will not be able to reset the flip-flop and hence the gates 134 and 136 will be unable to reset the missing pulse detector 146. If the interrupted channel is No. 16, the same result will occur since the output of inverter 104 will remain high. If subsequently the intruding object is removed, when the Channel No. 16 detectors are illuminated the output line of inverter 104 will go low and will thereby reset the flip-flop. With the Q terminal of the flip-flop now high, the gates 134 and 136 are again enabled to trigger one-shots 140 and 142 in response to positive signals from gates 106 and 108 respectively. Since the signals now applied to the two inverting terminals of gate 132 are both low, the output line of gate 132 and hence terminal 133 will go high and thereby enable gate 76 so that it can trigger one-shots 78 and 80 when the Channel No. 1 detectors are again illuminated.

The transient suppressor 170 is used to suppress undesired sparking which might cause an early relay contact failure. Suppressor 170 may be solid state, e.g. it may comprise a varistor. Fuse 168 protects against an unlikely shorting out of the transient suppressor.

It is to be appreciated that the number of channels in each group of channels and the number of duplicate groups of channels may be varied, as may the order of strobing the channels. Thus for example, the transmitter may consist of the single light source assembly 6B and the receiver may consist of the single photodetector assembly 16B, in which case the gates 76 and 88 will have only one input line for a photodetector signal.

Also, the light source and photodetector assemblies may consist of only eight units, in which case the transmitter unit of FIG. 2 will have eight less of the one-shots 40 and 42 and the receiver unit will have eight less signal channels and gates 106 and 108 each will have only four input lines. Other modifications will be obvious to persons skilled in the art. Thus, the transmitter and receiver units may be oriented horizontally or at an inclined angle so as to monitor a horizontal or inclined area.

Although the invention has been described in connection with its use to control operation of a machine, it is to be understood that it may be used for other purposes, e.g. to operate an alarm or visual indicator, actuate a door operating mechanism, or disable an electrical power system. Still other applications will be obvious to persons skilled in the art.

It is to be appreciated that the one-shots 28, 30, 32 and 34 and OR gate 35 of the transmitter function as an encoder, while the one-shots 78 and 80, inverter 84 and gate 82 of the receiver function as a decoder. In this connection it is to be appreciated that the timing requirements of the decoder constituting receiver Channel No. 1 substantially eliminate any possibility of one-shot 86 being triggered by random ambient light flashes. Similarly, the one-shots 92 establish timing relationships between the other receiver channels that substantially prevent the receiver from confusing ambient light flashes with light beams from the transmitter. The ability of the receiver to ignore random light flashes is improved by employing collecting lenses 24 with limited light acceptance angles.

What is claimed is:

1. An object detecting system for determining when an object intrudes into a given area, said system comprising a transmitter for providing a radiant energy barrier that traverses said area and a receiver for detecting when said barrier is encountered by an intruding object;

said transmitter comprising a plurality of radiant energy sources each adapted to direct a beam of radiant energy across said area with each beam traversing a different portion of said area, means for operating said sources repetitively and sequentially in a predetermined order and at a selected frequency so that repetitively and sequentially said different areas are traversed by beams produced by said sources;

said receiver being electrically independent of said transmitter and comprising a like plurality of radiant energy detector means each adapted to receive a different one of said beams after said beam has traversed said area, each of said detector means being sensitive to said radiant energy and being adapted to produce an electrical signal that is a function of the radiant energy received thereby, a like plurality of signal channels each having an input line connected to a different one of said detector means and each comprising enabling means for enabling it to be responsive to the electrical signal produced by the detector means to which it is connected, means for operating said enabling means to that said signal channels are enabled repetitively and sequentially at said selected frequency and in the same order as the order of operation of the sources producing the beams received by the detector means to which said signal channels are connected, means for preventing operation of said enabling means until a predetermined one of said detector means has received a beam from one of said sources, and signal detector means connected to said signal channels for producing an output control signal responsively to the lack of an electrical signal on the input line of a channel when the enabling means of said same channel is operated.

2. A system according to claim 1 wherein said signal detector means comprises relay means and relay control means for actuating said relay means responsively to the lack of an electrical signal on the input line of a channel when the enabling means of said channel is operated.

3. A system according to claim 2 wherein said relay means comprises first and second relays and said relay control means comprises first means for actuating said first relay means responsively to the lack of an electrical signal on the input line of certain of said channels and second means for operating said second relay responsively to the lack of an electrical signal on the input line of the other of said channels.

4. A system according to claim 3 further including means for actuating one of said relays when the other relay is actuated responsively to the lack of an electrical signal on the input line of a channel.

5. A system according to claim 1 wherein said means for operating said enabling means comprises means for deriving a signal from each channel in response to but delayed in time with respect to the electrical signal appearing on the input line of said channel and applying said signal to the enabling means of another channel.

6. A system according to claim 1 wherein said sources are operated one at a time in said predetermined order with one of said sources being operated N times before the next source in said order is operated, where N is an integer that exceeds the number of times that said next source is operated before another source is operated, and further wherein the particular signal channel of the receiver that is connected to the detector means which is adapted to receive the beam produced by said one source comprises means for preventing enabling of the other signal channels unless N electrical signals are produced by the detector means of said particular signal channel before an electrical signal is produced by the detector means which receives the beam from said next source.

7. A system according to claim 1 wherein each of said radiant energy sources is adapted to generate a beam of radiant energy when energized by an electrical signal input, and further wherein said means for operating said sources comprises a plurality of electrical pulse generating means, means coupling each of said pulse generating means to a different one of said sources, and means connecting said plurality of pulse generating means in series for operating each pulse generating means responsively and in time delay relation to the electrical pulse output of the pulse generating means that precedes said each pulse generating means in said series.

8. A system according to claim 7 wherein each of said pulse generating means comprises a monostable multivibrator.

9. A system according to claim 7 wherein said means connecting said pulse generating means comprises a plurality of monostable multivibrators each responsive to the output of one pulse generating means and connected so that its output will operate the pulse generating means that follows said one pulse generating means in said series.

10. A system according to claim 7 wherein said plurality of pulse generating means are operated sequentially one at a time at selected intervals, and further including an additional pulse generating means connected to one of said sources in parallel with one of said plurality of pulse generating means, and means for operating said additional pulse generating means in time delay relation to said one pulse generating means responsively and in time delay relation to the output of the pulse generating means that precedes said one pulse generating means in said series.

11. A system according to claim 10 wherein said receiver comprises means for preventing enabling of said signal channels repetitively and sequentially until the signal channel that is connected to the detector means which is adapted to receive the beam produced by said one radiant energy source has received two electrical signals before an electrical signal is produced by another of said detector means.

12. A system according to claim 1 wherein said radiant energy sources are adapted to produce beams of infrared light and said radiant energy detectors are sensitive to infrared light and substantially insensitive to visible light.

13. A system according to claim 12 wherein said detectors comprise means for preventing production of said electrical signals when said detectors are constantly illuminated by said beams.

14. A system according to claim 1 wherein said signal channels are adapted to produce output signals responsive to said electrical signals when said electrical signals occur during the time that said signal channels are enabled, and further wherein said receiver comprises means for producing a strobing signal responsive to each of said signal channel output signals and means for applying said strobing signals so as to control operation of said signal channel enabling means.

15. An object detecting system for determining when an object intrudes into a given area, said system comprising a transmitter for providing a light barrier that extends along said area and a receiver for detecting when said barrier is encountered by an intruding object, said transmitter comprising a plurality of light sources each adapted when operated to produce a beam of light that extends along said area with each beam traversing a different selected portion of said area; strobing means for repetitively operating said light sources one at a time in a predetermined sequence with one of said light sources being operated N times before the next light source in said sequence is operated, where N is an integer that exceeds the number of times that said next light source is operated in said sequence;

said receiver comprising a like plurality of photodetector means, with one of said photodetector means being adapted to receive the beam produced by said one light source after said beam has traversed said area, and the other photodetector means each being adapted to receive the beam produced by a different light source, each detector means being capable of producing an electrical signal in response to a light beam received thereby;

a plurality of signal channels each connected to receive the electrical signal output of a different detector means;

said signal channels each including means for producing an output signal responsive to the electrical signal of the photodetector means to which it is connected;

means for enabling said signal channels so that each signal channel is enabled in synchronism with operation of the light source producing the beam that is received by the photodetector means to which said each signal channel is connected;

means for preventing enabling of said signal channels until said one photodetector means has been illuminated N times within a predetermined time interval that is different than the time consumed in operating said one light source N times and said next light source once in said sequence;

and means connected to said signal channels for producing an output control signal whenever any one of said signal channels fails to produce an output signal when enabled.

* * * * *

PO-1050
(5/69)

UNITED STATES PATENT OFFICE
CERTIFICATE OF CORRECTION

Patent No. __3,805,061__     Dated __April 16, 1974__

Inventor(s) __Phillipe R. Des Rioux de Messimy et al__

It is certified that error appears in the above-identified patent and that said Letters Patent are hereby corrected as shown below:

Claim 1, Column 17, Line 42, change "to" to --so--.

Signed and sealed this 10th day of September 1974.

(SEAL)
Attest:

McCOY M. GIBSON, JR.
Attesting Officer

C. MARSHALL DANN
Commissioner of Patents